US005206754A

United States Patent [19]

Yano et al.

[11] Patent Number: 5,206,754

[45] Date of Patent: Apr. 27, 1993

[54] MOISTURE CONDENSATION PREVENTION STRUCTURE FOR LASER SCANNING OPTICAL SYSTEM

[75] Inventors: Takaaki Yano, Kawagoe; Masahide Inoue, Saitama, both of Japan

[73] Assignee: Asahi Kogaku Kogyo Kabushiki Kaisha, Tokyo, Japan

[21] Appl. No.: 683,544

[22] Filed: Apr. 10, 1991

[30] Foreign Application Priority Data

Apr. 10, 1990 [JP] Japan .................................. 2-94421

[51] Int. Cl.[5] .............................................. G02B 26/08

[52] U.S. Cl. .................................. 359/196; 359/216; 359/218; 346/108; 346/160; 355/30; 355/233

[58] Field of Search ............... 359/216, 217, 218, 219, 359/220, 221, 223, 232, 196, 197, 511, 512, 513, 514; 250/560, 234, 235, 236; 346/108, 160; 355/30, 215, 233, 271, 326

[56] References Cited

U.S. PATENT DOCUMENTS

| | | | |
|---|---|---|---|
| 4,198,156 | 4/1980 | Barker et al. | 355/30 |
| 4,297,713 | 10/1981 | Ichikawa et al. | 359/218 |
| 4,334,762 | 6/1982 | Landa | 355/8 |
| 4,731,623 | 3/1988 | Oda et al. | 359/216 |
| 4,868,673 | 9/1989 | Negoro | 346/108 |
| 4,945,385 | 7/1990 | Kimura | 346/160 |

FOREIGN PATENT DOCUMENTS

| | | | |
|---|---|---|---|
| 58-93025 | 6/1983 | Japan | 359/218 |
| 58-174920 | 10/1983 | Japan | 359/218 |
| 1-35411 | 2/1989 | Japan | 359/218 |
| 2201252 | 8/1988 | United Kingdom . | |

*Primary Examiner*—Loha Ben

*Attorney, Agent, or Firm*—Sandler, Greenblum & Bernstein

[57] ABSTRACT

In a laser scanning system employed in an electrophotographic image forming apparatus there are provided a polygon mirror moveably driven in order to enable a laser beam to repeatedly scan a predetermined range and a mirror for reflecting the scanning laser beam to a photoconductive drum in a casing. The casing is separated by a heat insulating member in order to prevent circulation of air therein. Further, a covering member is arranged around the polygon mirror, so as to restrict the occurrence of air flow in the casing due to the movement of the polygon mirror.

10 Claims, 3 Drawing Sheets

MOISTURE CONDENSATION PREVENTION STRUCTURE FOR LASER SCANNING OPTICAL SYSTEM

BACKGROUND OF THE INVENTION

The present invention relates to a laser scanning optical system having a deflecting device for dynamically deflecting a laser beam emitted from a laser source, and a mirror to introduce the deflected laser beam in a predetermined direction.

Recently known is a printer employing a so-called electrophotographic image forming process such as a laser beam printer, wherein a uniformly charged photoconductive material, provided on a photoconductive drum, is exposed to a scanning laser beam which in ON/OFF modulated, based on an image data, to form an electrostatic latent image. A hard copy of the image data is obtained through a copying process comprising development, transferring, and fixing steps.

FIG. 3 shows an example of the laser beam printer comprising a charging unit A, exposing unit B, development unit C, transfer unit D, cleaner unit E and discharging unit F disposed around a photoconductive drum 1 in the rotational direction thereof. The surface of the photoconductive drum 1 is formed from an electrostatic photoconductive material.

The photoconductive material on the surface of the photoconductive drum 1, uniformly charged at the charging unit A, is exposed to a scanning laser beam carrying image data (ON/OFF modulated in accordance with the image data) at the exposing unit B to form a latent image on the photoconductive material. Toner is stuck to the latent image at the development unit C for forming a toner image, and the toner image is transferred onto a recording sheet P which is fed synchronously with the rotation of the photoconductive drum 1 at the transfer unit D. The toner image transferred onto the recording paper P is then fused by being heated/pressed at a fixing unit G. Thus the toner image is fixed on the recording sheet P. Then the recording sheet P carrying the fixed toner image is discharged from the printer.

In the laser beam printer, the transfer unit D is disposed below the photoconductive drum 1. A recording sheet feed path is defined in the substantially horizontal direction on the right and left sides of the transfer unit D. A scanning optical system 10 as the exposing unit B is disposed above the photoconductive drum 1.

In the scanning optical system 10, a laser beam LB, emitted from a semiconductor laser, s repeatedly deflected by a polygon mirror 12 as a deflecting device. The repeatedly reflected laser beam (scanning laser beam) is imaged by an $f\theta$ lens 13 so that the scanning speed thereof, on the circumferential surface of the photoconductive drum 1, becomes an equal speed in proportion to a deflected angle. The light path thereof is reflected by a mirror 16 so that the laser beam is directed to the photoconductive drum 1. Main scanning of the laser beam, emitted from the scanning optical system 10, is executed in the axial direction of the photoconductive drum 1. Auxiliary scanning in the rotational direction of the photoconductive drum 1 is synchronous with the main scanning by the laser beam.

In this scanning optical system 10, each optical component must be installed with a high accuracy, and generally accommodated in a sealed cabinet in order to prevent the invasion and deposition of dust and the like.

Note that, the length of the light path of the laser beam from the polygon mirror 12 to the photoconductive drum 1 is preferably as short as possible to make the apparatus compact as a whole, whereas the length is preferably as long as possible in view of the aberration of the lens system and to keep the cost as low as possible.

Generally, the scanning optical system 10 is disposed above the photoconductive drum 1 as above, and the fixing unit G employs the heat roller fixing unit in which an unfixed toner image is heated and pressed with a pair of rollers to cause toner to be heated and adhered onto the recording sheet by being fused. In such a case, the scanning optical system 10 is disposed above the heat roll fixing unit, and is partially heated by the heat of the heat roll fixing unit. Thus, a problem arises in that moisture is condensed on the optical components in the scanning optical system 10 particularly in the environment of low temperature and high humidity.

More specifically, in the illustrated arrangement, the vicinity of the polygon mirror 12 is heated and the temperature of the air around the polygon mirror 12 is raised, and thus a temperature difference is caused between opposite sides of the casing (between the polygon mirror 12 side and the mirror 16 side). As a result, the rotation of the polygon mirror 12 causes the heated air around the polygon mirror 12 to reach the region of the mirror 16 on the other side, where the heated air is cooled on the surface of the mirror 16 and moisture is condensed on the mirror 16. In this case, even if the apparatus operates normally, a scanning laser beam does not reach the photoconductive drum 1 in good condition. Thus, a formed image becomes obscure on an image is not formed depending upon the degree of the moisture condensation.

Further, although not shown in FIG. 3, in the scanning optical system 10, a scanning laser beam at the ends of a scanning area, which does not contribute to the image formation, is reflected by a mirror (laser beam position detecting mirror) and introduced to a light sensor. The laser beam is modulated using a laser beam detecting signal from the light sensor as a trigger signal. When, however, moisture is condensed on the laser position detecting mirror, no image can be formed because the position of the scanning laser beam cannot be detected.

Further, as shown by the two-dotted lines in the figure, when the portion of the scanning optical system is swung about an axis X provided in the polygon mirror 12 side (with the high temperature side downward, low temperature side upward) to load a recording sheet or carry out maintenance, heated air instantaneously moves (rises) to the mirror 16 side, thereby moisture is heavily condensed on the mirror 16.

Generally, in order to prevent the moisture condensation, a method of heating components, on which moisture tends to be condensed by providing heating means therewith has been devised. In such a construction, however, a problem arises in that the structure thereof becomes complex because a power supply, wirings and temperature control are needed, and thus cost is increased.

SUMMARY OF THE INVENTION

It is therefore an object of the present invention to provide an improved laser scanning optical system in which the moisture condensation can be prevented with a simple structure at a low cost, even if a scanning optical system is disposed above a photoconductive drum and a heat roll fixing device is employed.

For the above object, according to the present invention, there is provided a laser scanning system employed in an electrophotographic image forming apparatus, comprising:

A deflecting device moveably driven in order to let a laser beam repeatedly scan a predetermined range;
a reflecting device for reflecting the scanning laser beam;
a casing accommodating the deflecting device and the reflecting device, an opening being formed on the casing through which the scanning laser beam reflected by the reflecting device is directed to a photoconductive member of the image forming apparatus, the laser scanning system further comprising device for preventing circulation of air in the casing.

Optionally, the device for preventing circulation of air in the casing comprises a separating member for separating the casing into one compartment containing a deflecting device and another compartment containing the reflecting device. The separating member has slit extending in the scanning direction of the laser beam. The laser beam is deflected by the deflecting device and passes through the slit to the reflecting device.

Further, the separating member is composed of heat insulating material.

Furthermore, the laser scanning system comprises a base plate for mounting the deflecting device thereon, a wall having a predetermined height being provided at the peripheral end of the base plate except the portion confronting the separating member, and wherein the device for preventing circulation of air in the casing comprises another separating member between at least one lateral end of the wall and the separating member.

According to another aspect of the invention, there is provided a laser scanning system employed in an electrophotographic image forming apparatus, comprising:

a deflecting device moveably driven in order to let a laser beam repeatedly scan a predetermined range;
a reflecting device for reflecting the scanning laser beam;
a casing accommodating the deflecting device and the reflecting device, an opening being formed on the casing through which the scanning laser beam reflected by the reflecting device is directed to a photoconductive member of the image forming apparatus, the laser scanning system further comprising; and
a device for restricting the occurrence of air flow in the casing due to the movement of the deflecting device.

Optionally the device for restricting the occurrence of air flow comprises a covering member for covering the deflecting device while allowing the laser beam to scan the predetermined range.

According to still another aspect of the invention, there is provided a laser scanning system employed in an electrophotographic image forming apparatus, comprising:

a deflecting device moveably driven in order to enable a laser beam to repeatedly scan a predetermined range;
a reflecting device for reflecting the scanning laser beam;
a casing accommodating the deflecting device and the reflecting device, an opening being formed on the casing through which the scanning laser beam reflected by the reflecting device is directed to a photoconductive member of the image forming apparatus, the laser scanning system further comprising;
a device for preventing circulation of air in the casing; and
a device for restricting the occurrence of air flow in the casing due to the movement of the deflecting device.

Further, the device for preventing circulation of air in the casing comprises a separating member for separating the casing into one compartment containing deflecting device and another compartment containing the reflecting device. The separating member has slit extending in the scanning direction of the laser beam, wherein the laser beam deflected by the deflecting device passes through the slit to the reflecting device.

Furthermore, the separating member is composed of heat insulating material.

Still further, the laser scanning system comprises a base plate for mounting the deflecting device thereon, with a wall having a predetermined height being provided at the peripheral end of the base plate except for the portion confronting the separating member. Wherein the device for preventing circulation of air in the casing comprises another separating member positioned between at least one lateral end of the wall and the separating member.

Furthermore, the means for restricting the occurrence of air flow comprises a covering member for covering the base plate mounting the deflecting device while allowing the laser beam to scan the predetermined range.

Still further, the covering member comprises an upper plate and a covering wall provided at the peripheral end of the upper plate except for the portion confronting the separating member.

Furthermore, the deflecting device comprises a rotatably driven polygon mirror, and wherein the lower surface of the upper portion of the covering member is arranged adjacent to the upper surface of the polygon mirror.

DESCRIPTION OF THE ACCOMPANYING DRAWINGS

DESCRIPTION OF THE EMBODIMENTS

Figure 1:
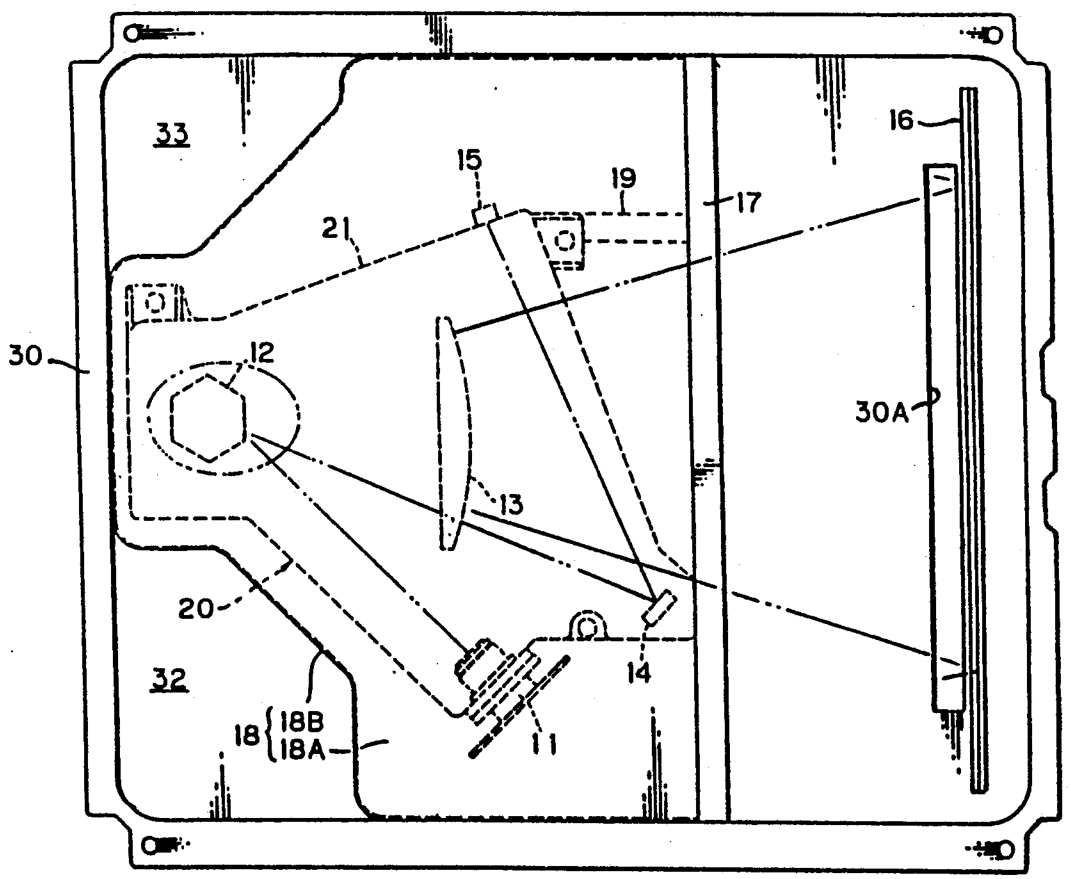
FIG. 1 is a plan view of a laser scanning unit employing a moisture condensation prevention structure embodying the present invention.
Figure 2:
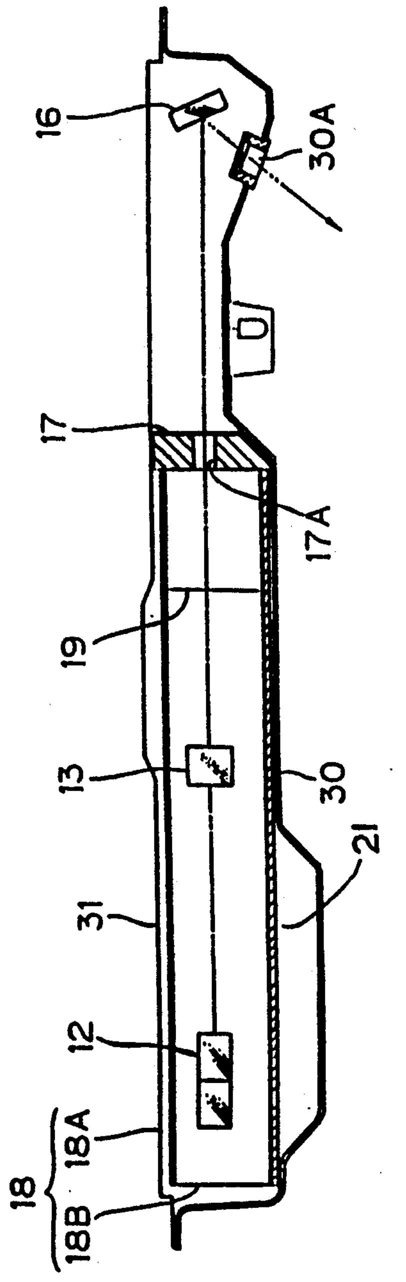
FIG. 2 is a vertical cross-sectional view of the laser scanning unit of FIG. 1.
Figure 3:
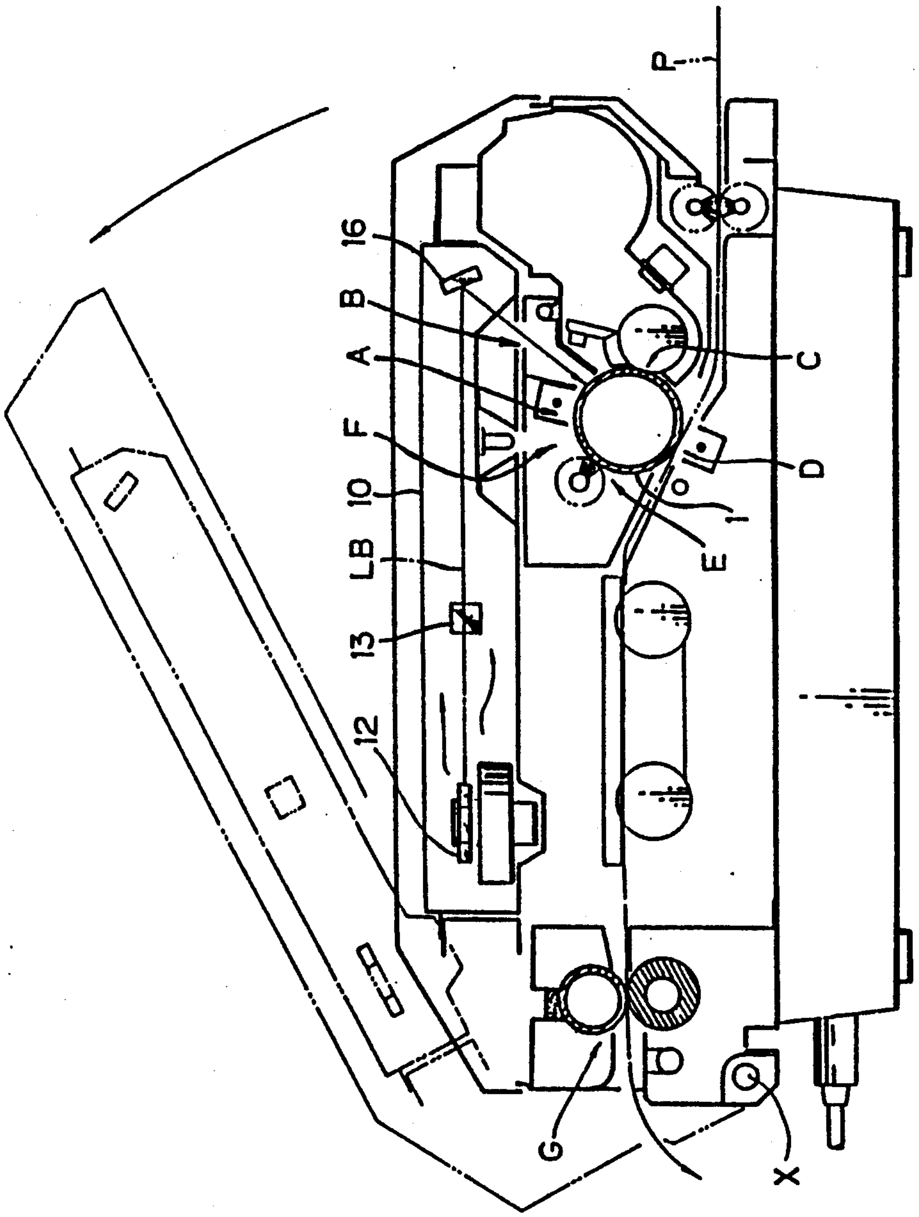
FIG. 3 is a schematic side view of an example of a laser beam printer.

FIG. 1 is a plan view of a laser scanning unit employing a moisture condensation prevention structure embodying the present invention, and FIG. 2 is a vertical cross-sectional view thereof.

In a laser scanning unit 10, a scanning optical system unit 20 is disposed in a box-shaped case 30 at a predetermined position at one side, with the case 30 having a flat rectangular shape and a predetermined depth. A mirror 16 is disposed at the other side of the case 30. The mirror 16 reflects a scanning laser beam emitted from the scanning optical system unit 20 and directs the same to the outside through a window 30A defined in the case 30 at a predetermined position on the bottom of the case 30. The scanning optical system unit 20 comprises a semiconductor laser 11, polygon mirror 12, fθ lens 13, beam position detecting mirror 14, and light sensor 15 for detecting a beam position which are disposed on a unit base 21 in a predetermined positional relationship. Note, although not shown in the figure, the upper surface of the case 30 is covered by a cover 31.

The scanning optical system unit 20 has a fan shape corresponding to the scanning area of a laser beam with the polygon mirror 12 disposed at one end thereof. The semiconductor laser 11 and the beam position detecting mirror 14 are disposed at one side of the fan shape, and the light sensor 15 for detecting the beam position is disposed at the other side thereof.

A laser beam emitted from the semiconductor laser 11 is deflected by the rotated polygon mirror 12. The beam reaches the mirror 16 through the fθ lens 13, and is reflected by the mirror 16 irradiating the outside (to a not shown photoconductive drum) through the window 30A. Further, a scanning laser beam located outside the scanning area which does not contribute to the image formation, is reflected by the beam position detecting mirror 14 and directed to the light sensor 15 for detecting the scanning position of the laser beam.

A heat insulating wall 17, having a predetermined thickness composed of a heat insulating material, is interposed between the scanning optical system unit 20, which is in parallel with the mirror 16 in the vicinity of the front end (mirror 16 side end) of the unit base 21. Thus, the heat insulating wall 17 divides the case 30 into a region of the scanning optical system unit 20 and a region of the mirror 16.

The heat insulating wall 17 is made of a high heat insulating material such as neochloroprene sponge or the like, and has a height substantially equal to the depth of the case 30 and a length substantially equal to the width of the case 30. Further, a split 17A, through which the scanning laser beam can pass, is defined at a predetermined position on the heat insulating wall 17. Note that, in the present embodiment, since the end of the unit base 21 on the mirror 16 side is inclined, a heat insulating wall 19, similar to the insulating wall 17, is provided to connect the end of the unit base 21 which is spaced apart from the heat insulating wall 17, to the insulating wall 17.

Further, the scanning optical system unit 20 is covered with an air stream prevention cover 18 as an air stream prevention device.

The air stream prevention cover 18, composed of a synthetic resin material such as a polyimide sheet or the like comprising an upper plate 18A, and a circumferential wall 18B having a predetermined height, is formed along the outer configuration of the scanning optical system unit 20 except the front end side (scanning laser beam emitting side) thereof.

The air stream prevention cover 18 is placed on the bottom of the case 30 with the lower surface of the circumferential wall 18B contacting the upper surface of the bottom of the case 30. The front end of the air stream prevention cover 18, where the circumferential wall 18B is not formed, is abutted against the heat insulating wall 17 and is attached thereto. The lower surface of the upper plate 18A is located as near as possible to the upper surface of the scanning optical system unit 20 (upper portion of the polygon mirror 12) so that the amount of the air affected by the rotation of the polygon mirror 12 is reduced.

With the above arrangement, since the circumference of the polygon mirror 12 is covered by the air stream prevention cover 18, the air flow, which occurs due to the rotation of the polygon mirror 12, is restricted. More specifically, the volume of the space affected by the rotation of the polygon mirror 12 is reduced, the spaces 32, 33, located between the air stream prevention cover 18 and the case 30, are isolated from the polygon mirror 12 and are not affected by the rotation of the polygon mirror. The air in the spaces 32, 33 does not flow. Further, since the scanning optical system unit region is isolated from the mirror 16 region by the heat insulating wall 17, circulation of air is prevented therebetween.

As a result, for example, even if the heat roll fixing unit is disposed below the polygon mirror 12 and the temperature of the air in the spaces 32, 33 is raised, the heated air does not flow and the moisture condensation on the optical system components can be prevented. Further, the air in the scanning optical system unit region is prevented from reaching the mirror 16 region, thereby the moisture condensation on the mirror 16 can be prevented.

In other words, the separation of the interior of the scanning unit 10, with the air stream prevention cover 18 and heat insulating wall 17 regulates an air flow between the respective spaces and prevents the heated air from reaching the optical components that have a low temperature, thereby the moisture condensation is prevented.

As described above, according to the moisture condensation prevention structure for a laser scanning optical system embodying the present invention, the generation of the air flow is prevented by the air stream generation prevention device. Further, the circulation of the air in the laser scanning optical system is regulated by the heat insulating member, so that moisture condensation on the optical components, constituting the laser scanning optical system, is prevented by a simple structure at a low cost.

The present disclosure relates to a subject matter contained in Japanese patent application No. HEI 2-94421 (filed on Apr. 10, 1990) which is expressly incorporated herein by reference in its entirety.

What is claimed is:

1. A laser scanning system employed in an electrophotographic image forming apparatus, comprising: deflecting means movably driven in order to enable a laser beam to repeatedly scan a predetermined range;

reflecting means for reflecting said scanning laser beam;

a casing that accommodates said deflecting means and said reflecting means, an opening being formed on said casing through which said scanning laser beam, reflected by said reflecting means, is directed to a photoconductive member of said image forming apparatus, said laser scanning system further comprising:

a separating member for preventing a circulation of air in said casing by separating said casing into one room containing said deflecting means and another room containing said reflecting means, said separating member having a slit that extends in a scanning direction of said laser beam, said laser beam, deflected by said deflecting means, passing through said slit to said reflecting means, said separating means being composed of a heat insulating material.

2. A laser scanning system employed in an electrophotographic image forming apparatus, comprising:

deflecting means movably driven in order to enable a laser beam to repeatedly scan a predetermined range;

reflecting means for reflecting said scanning laser beam;

a casing that accommodates said deflecting means and said reflecting means, an opening being formed on said casing through which said scanning laser beam, reflected by said reflecting means, is directed to a photoconductive member of said image forming apparatus, said laser scanning system further comprising:

a separating member for preventing a circulation of air in said casing by separating said casing into one room containing said deflecting means and another room containing said reflecting means, said separating member having a slit that extends in a scanning direction of said laser beam, said laser beam, deflected by said deflecting means, passing through said slot to said reflecting means; and a base plate for mounting said deflecting means thereon, a wall having a predetermined height being provided at a peripheral end of said base plate except for a portion confronting said separating member, and wherein said separating member for preventing said circulation of air in said casing comprises another separating member positioned between at least one lateral end of said wall and said separating member.

3. A laser scanning system employed in an electrophotographic image forming apparatus, comprising:

deflecting means movably driven in order to enable a laser beam to repeated scan a predetermined range;

reflecting means for reflecting said scanning laser beam;

a casing that accommodates said deflecting means and said reflecting means, an opening being formed on said casing through which said scanning laser beam, reflected by said reflecting means, is directed to a photoconductive member of said image forming apparatus, said laser scanning system further comprising:

a separating member for preventing a circulation of air in said casing by separating said casing into one room containing said deflecting means and another room containing said reflecting means, said separating member having a slot that extends in a scanning direction of said laser beam, said laser beam, being deflected by said deflecting means, passing through said slit to said reflecting means, said separating member being composed of a heat insulating material; and means for restricting the occurrence of air flow in said casing due to the movement of said deflecting means.

4. A laser scanning system employed in an electrophotographic image forming apparatus, comprising:

deflecting means movably driven in order to enable a laser beam to repeatedly scan a predetermined range;

reflecting means for reflecting said scanning laser beam;

a casing that accommodates said deflecting means and said reflecting means, an opening being formed on said casing through which said scanning laser beam, reflected by said reflecting means, is directed to a photoconductive member of said image forming apparatus, said laser scanning system further comprising:

a separating member for preventing circulation of air in said casing by separating said casing into one room containing deflecting means and another room containing said reflecting means, said separating member having a slit that extends in a scanning direction of the laser beam, said laser beam, deflected by said deflecting means, passing through said slit to said reflecting means;

means for restricting the occurrence of air flow in said casing due to the movement of said deflecting means; and a base plate for mounting said deflecting means thereon, a wall having a predetermined height being provided at a peripheral end of said base plate except for a portion confronting said separating member, and wherein said separating member for preventing said circulation of air in said casing comprises another separating member positioned between at least one lateral end of said wall and said separating member.

5. The laser scanning system according to claim 4, wherein said means for restricting the occurrence of air flow comprises a covering member for covering said base plate mounted thereon said deflecting means which allows the laser beam to scan said predetermined range.

6. The laser scanning system according to claim 5, wherein said covering member comprises an upper plate and a covering wall provided at the peripheral end of said upper plate, except for the portion confronting said separating member.

7. The laser scanning system according to claim 6, wherein said deflecting means comprises a rotatably driven polygon mirror, and wherein the lower surface of said upper surface of said covering member is arranged adjacent to the upper surface of said polygon mirror.

8. A laser scanning system employed in an electrophotographic image forming apparatus, comprising:

a deflector that is movably driven in order to enable a laser beam to repeatedly scan a predetermined range;

a reflector that reflects said scanning laser beam;

a casing that accommodates said deflector and said reflector, an opening being formed on said casing through which said scanning laser beam, reflected by said reflector, is directed to a photoconductive member of said image forming apparatus; and a wall that is placed between said deflector and said reflector, and which has a slit that extends in a scanning direction of said laser beam, said laser beam, deflected by said deflector, passing through said slit to said reflector, said wall being composed of a heat insulating material.

9. The laser scanning system of claim 8, wherein said deflector comprises a rotatably driven polygonal mirror.

10. The laser scanning system of claim 8, further comprising a base plate for mounting said deflector thereon.

* * * * *

UNITED STATES PATENT AND TRADEMARK OFFICE

CERTIFICATE OF CORRECTION

PATENT NO. : 5,206,754

DATED : April 27, 1993

INVENTOR(S) : T. YANO et al.

It is certified that error appears in the above-indentified patent and that said Letters Patent is hereby corrected as shown below:

At column 7, line 39 (claim 3, line 4), change "repeated" to ---repeatedly---.

At column 7, line 53 (claim 3, line 18), change "slot" to ---slit---.

Signed and Sealed this

Third Day of May, 1994

Attest:

BRUCE LEHMAN

*Attesting Officer* *Commissioner of Patents and Trademarks*